Feb. 12, 1929.

G. ERNST 1,701,914

WATER GAUGE

Filed April 9, 1925

INVENTOR
George Ernst
BY
Geo. L. Beeler
ATTORNEY

Patented Feb. 12, 1929.

1,701,914

UNITED STATES PATENT OFFICE.

GEORGE ERNST, OF NEWARK, NEW JERSEY.

WATER GAUGE.

Application filed April 9, 1925. Serial No. 21,791.

This invention relates to boiler gauges and more particularly to devices of that character which are adapted to indicate the water level in the boiler.

Among the objects of this invention is to provide a water level gauge comprising novel means for controlling the flow of condensate within the gauge and whereby the erosion of the gauge glass is wholly eliminated.

Another object of this invention is to provide means whereby the water level in the gauge glass can be most readily ascertained, said means taking the form generally of a coloring liquid and a reservoir to supply the same as desired.

Still another object of this invention is to provide a water level gauge comprising novel guard means for the gauge glass arranged to afford the maximum protection to both the glass and to the operator, said guard means being arranged preferably to embody a length adjusting feature.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1:
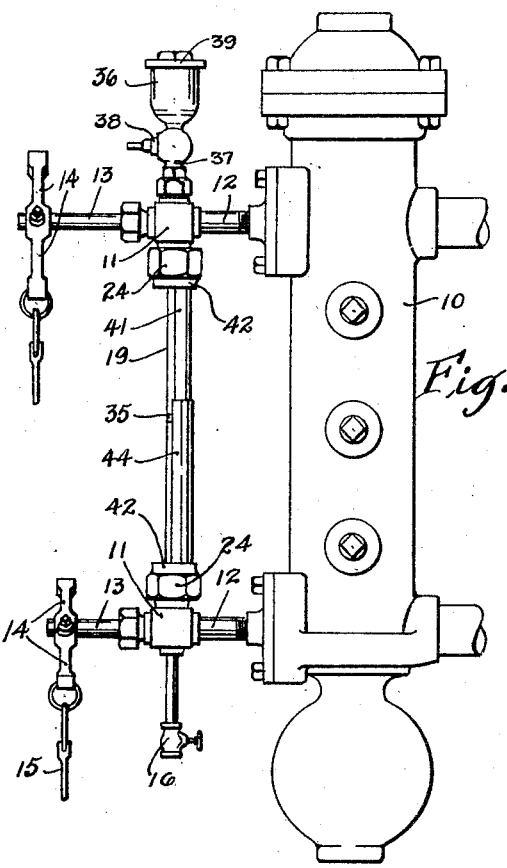
Figure 1 is a side view showing a typical use of the invention.
Figure 2:
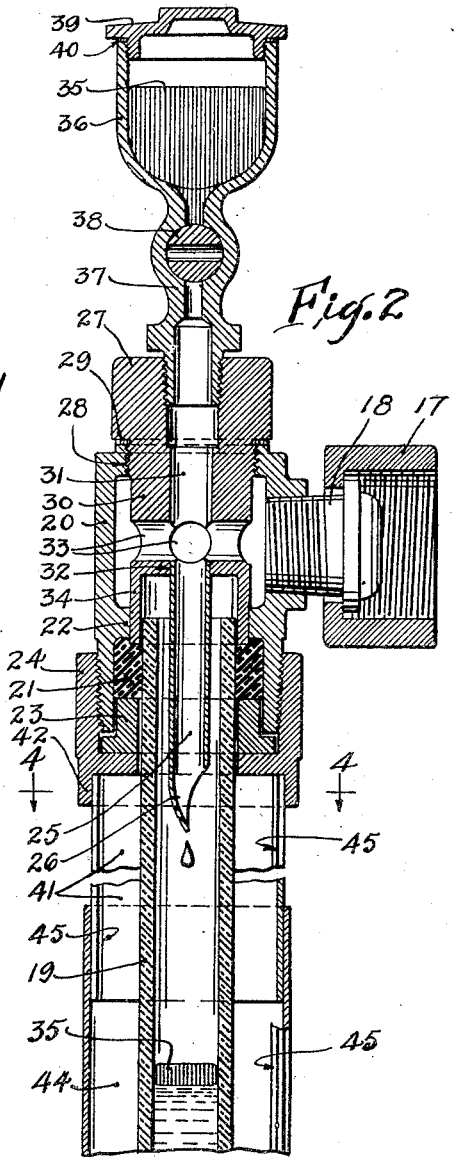
Fig. 2 is an enlarged vertical section of the main part of the improvement.
Figure 3:
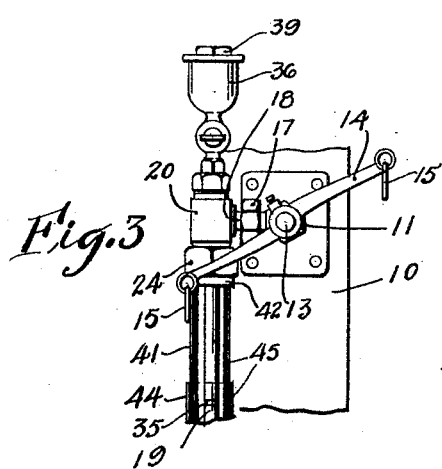
Fig. 3 is a front view of a portion of the arrangement shown in Fig. 1.

Referring now more particularly to the drawings, I show the water level gauge as mounted in connection with a fluid container or water column 10, as by means of the valves 11 which are attached to said water column through the nipples 12. Said valves are operative by means of the stems 13 which carry the arms 14 arranged to be manipulated by the chains 15, the lower valve being provided with a drain or blow-off 16. Means are provided whereby the water level gauge connects with said valves, said means taking preferably the form of the union fittings 17 which lead into the valves at right angles to the axes thereof, said unions having engagement with the gauge by means of the nipples 18.

The gauge comprises a glass 19 and upper and lower bodies 20 arranged to receive the ends of the glass and to make the same steam tight by means of the resilient packing ring 21. Each of said bodies is provided with an annular shoulder 22 against which said ring is compressed as by means of a gland 23 and a novel nut member 24 so that the ring will embrace the gauge glass snugly. Means for depositing condensate or other liquid centrally of the gauge glass and at a point spaced from the upper end thereof is provided, said means taking the form preferably of a tubular drip or centralizing tube 25 which is coaxial with the gauge glass and the discharge end whereof has a curved portion 26 the tip of which lies along the axis of the glass to insure that the condensate will be discharged centrally of the glass and remotely from the sides thereof.

It will be noted that the effect of condensate in striking glass at the instant when the condensation takes place is to erode the glass. However, by arranging for a discharge of the condensate within the glass and remotely from the end thereof, I find that such erosion is completely eliminated. And to guard against the possibility of any of the liquid striking the glass, I cause said liquid to be discharged axially of the gauge glass in a manner above described. Thus the tip of the tube being spaced more remotely from the wall of the glass, the possibility of condensate splashing upon the wall of the glass is eliminated. Generally, the tip of the centralizing tube will be so arranged, whether used in the vertical or in the inclined gauge as to provide for the maximum and most effective protection of the gauge glass.

Said tube is mounted in a suitable manner in the upper body or head to communicate with the inlet or nipple 18 and preferably by means of a central plug 27 which is threaded into the upper end of the head at 28 and has suitable co-operation therewith as by means of a gasket 29 for making a fluid tight joint therewith. Said plug comprises a shank or body portion 30 which is smaller than the internal size of the head to provide an annular clearance. Said shank portion is provided with an axial bore 31 with which said tube registers at 32, said bore communicating with said annular clearance by means of one or more transverse holes 33. Said shank is arranged to terminate preferably in a cylindrical flange 34 which fits within the shoulder 22 and is adapted to bear upon the packing ring 21 to effect a tight connection and provide against any condensate coming in contact with the extreme edge of the glass. In assembling the device, the plug 27 will be inserted into the head and made up tight, and then the nut or cap 24 applied and tightened.

In order to permit of an easier observation of the level of the water in the gauge glass, I place by any suitable means or method a coloring matter in the glass, which is lighter than water so as to be adapted to float upon the surface thereof and indicate more clearly the precise level thereof. Preferably, I use an oil 35 for this purpose, and provide novel means for introducing the same into the glass. Said means in the form shown takes the form of a reservoir 36 which is arranged to discharge oil or other liquid into the glass through the tube 25 and for this purpose has communication with the axial bore 31 as by means of a stem 37 within which a valve 38 is fitted to control the flow of said liquid. Thus after the gauge is blown out, the valve is opened, and a few drops of coloring liquid permitted to flow into the glass. The reservoir is topped by a plug 39 which co-operates with a gasket 40 to effectively close the reservoir at such times and prevent leakage under the high pressure then existing within the reservoir while the valve is open.

Figure 4:
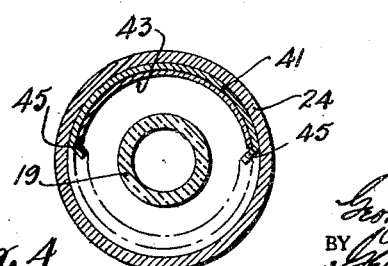
Fig. 4 is a section taken on the line 4—4 of Fig. 2.

Novel guard means 41 is provided to protect the glass, which is rotatable about the axis of the glass to protect the same from any angle as may be desired, or the operator from the effects of a possible breakage of the glass and sudden leakage of steam therefrom. Said guard means co-operates for this purpose with both the upper and lower heads 20, as within cylindrical flanges 42 thereof, and wherein said guard is rotatably retained as shown by dot-dash lines in Fig. 4. A card 43 is mounted within said guard, whereby the level of the water may be read more easily. In order to render the length of the guard adjustable to the particular gauge used and to permit of easy detachment thereof from the gauge, I construct the same of a plurality of parts, one of which 44 is arranged to telescopically engage the other as by means of the edge flanges 45. Both parts of the guard are effectively retained within the flanges 42 as by being sprung thereinto, said guard being constructed for this purpose of relatively thin material.

Believing it to be new with me to insert into a sight glass a liquid or other substance having a color contrasting with the boiler water in order to render more positive the readings of the glass, I wish to point out that as gauge glasses are now commonly made and used when they become completely filled with boiler water there exists always the uncertainty of not knowing readily or easily whether the gauge glass is full or empty, and so this is a constant source of danger in steam boiler practice. By use of this improvement therefore and the introduction of a colored liquid or coloring matter into the glass so that either the meniscus or some of the body of the liquid in the tube is colored, the aforesaid uncertainty is eliminated. When the coloring matter is of a substantially permanent nature such as above referred to and the colored portion of the contents of the tube passes out of sight the attendant must know that the water level is dangerously high or low, but it would be a rare case when the color would pass either up or down without the attention of the attendant being attracted to it. If, however, all the liquid in the tube is colored in the normal practice it will always show color or such a contract with the boiler water as to insure correct reading. My improvement, furthermore, provides for the easy replenishing of the color after the used coloring matter has blown out in the usual practice.

The liquid employed by me as a conveyer for the coloring matter being an oil, may tend to loosen the coating that ordinarily accumulates on the inner surface of the glass tube, and so the rise and fall of the color medium 35 in the glass due to the fluctuations or changes in level of the water in the boiler serve to keep the sight glass perfectly clean, and consequently the readings of the glass for this reason are very much more reliable and accurate than if such accumulation or coating would remain undisturbed.

I claim:

1. In a gauge including a glass and an upper head, a plug serving as a closure for the top of said head, a part of said plug projecting into said head, said part being spaced from the inner surface of the head, there being central and transverse passages in said plug for establishing communication between the interior of said head and the glass of the gauge, a liquid conveying member extending from said plug into said glass and communicating with the central passage of the plug, a liquid receptacle disposed above and connected with said plug, there being a passage between said receptacle and the central passage of said plug, a valve for closing the last mentioned passage, a gland in said head, and packing for forming a tight connection between said head and said gland, said plug having a flange abutting said packing to form a tight connection and prevent communication between said plug and said glass except through said liquid conveying member.

2. In a gauge including a glass and an upper hollow head, a plug associated with and serving as a closure for the top of said head and having a portion thereof disposed within said head, the part of the plug disposed within said head being spaced from the latter's inner surface, central and transverse passages being provided in said plug for establishing communication between the hollow part of said head and the glass of said gauge, a liquid conveying member associated with and extending from the bottom of said plug and forming a continuation of its central passage, said member projecting into said glass and provided with a liquid drip centralizing end, and a smaller longitudinally apertured plug in the upper end of said central passage, said plug carrying a color-liquid container adapted to discharge into the central passage of the first-mentioned plug through the aperture of said smaller plug, there being a valve on the smaller plug controlling such discharge, and means for making the glass tight in the head including a gland and packing therefor, said first mentioned plug having a flange abutting said packing to prevent communication between said head and said glass except through said plug and the liquid conveying member.

3. In a gauge including a glass and an upper hollow head, a plug associated with and serving as a closure for the top of said head and having a portion thereof disposed within said head, the part of the plug disposed within said head being spaced from the latter's inner surface, central and transverse passages being provided in said plug for establishing communication between the hollow part of said head and the glass of said gauge, a liquid conveying member associated with and extending from the bottom of said plug and forming a continuation of its central passage, said member projecting into said glass and provided with a liquid drip centralizing end, and a smaller longitudinally apertured plug in the upper end of said central passage, said plug carrying a color-liquid container adapted to discharge into the central passage of the first-mentioned plug through the aperture of said smaller plug, there being a valve on the smaller plug controlling such discharge, said liquid conveying member being disposed centrally within the glass of said gauge, the liquid drip centralizing end of said member constituting a sharp tip, the extreme point of which is disposed substantially equidistant from all wall portions of said glass at the level of said point, said point being substantially in the center line of said member.

4. In a gauge including a glass and an upper hollow head, a nipple forming a water and steam inlet to the interior of the head, a plug sealed in said head and annularly spaced therefrom, the plug having a sleeve formed on the bottom thereof and a radial passage and an axial passage intercommunicating, a color-liquid tube secured in the plug and having a bore connecting with the axial passage, said tube extending down to terminate in a drip point within the glass in substantially the center line thereof, and means for centering the tube and the glass and simultaneously steam packing the upper end of the glass and the lower ends of the head and plug including a packing recess in the head below the plug, packing in said recess, the sleeve on the bottom of the plug engaging the upper side of said packing, a bottom nut sleeving the glass and having a recess in its upper part, a loose collar in the last-mentioned recess and at its top engaging the bottom of said packing, said bottom nut being secured to said head and exerting pressure on said collar.

5. In a gauge of the character described, the combination with a glass and an upper head therefor, of means in said head to guide a predetermined amount of a coloring liquid centrally into said glass, and means to pack the glass in said head, said first mentioned means having coaction with said packing means at the adjacent end of the glass to prevent communication between the head and the glass except through said first mentioned means.

In testimony whereof I affix my signature.

GEORGE ERNST.